United States Patent
Hsu et al.

(10) Patent No.: US 12,224,469 B2
(45) Date of Patent: Feb. 11, 2025

(54) METHOD OF OPTIMIZING SURFACE OF CARBON ELECTRODE FOR FLOW BATTERY

(71) Applicant: Institute of Nuclear Energy Research, Atomic Energy Council, Executive Yuan, R.O.C., Taoyuan (TW)

(72) Inventors: Ning-Yih Hsu, Taoyuan (TW); Hung-Hsien Ku, Taoyuan (TW); Han-Jou Lin, Taoyuan (TW); Qiao-Ya Chen, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 798 days.

(21) Appl. No.: 17/470,050

(22) Filed: Sep. 9, 2021

(65) Prior Publication Data
US 2023/0072808 A1    Mar. 9, 2023

(51) Int. Cl.
*H01M 8/18*     (2006.01)
*H01M 4/88*     (2006.01)
*H01M 4/90*     (2006.01)
*H01M 8/04746*  (2016.01)

(52) U.S. Cl.
CPC ......... *H01M 8/188* (2013.01); *H01M 4/8825* (2013.01); *H01M 4/90* (2013.01); *H01M 8/04746* (2013.01)

(58) Field of Classification Search
CPC .. H01M 4/8825; H01M 4/90; H01M 8/04746; H01M 8/188
See application file for complete search history.

(56) References Cited

U.S. PATENT DOCUMENTS

2020/0373588 A1* 11/2020 Ota ..................... H01M 4/0438

FOREIGN PATENT DOCUMENTS

JP         2020-139018      * 9/2020

OTHER PUBLICATIONS

English translation of JP Publication 2020-139018, Sep. 2020.*

* cited by examiner

*Primary Examiner* — Brittany L Raymond
(74) *Attorney, Agent, or Firm* — Demian K. Jackson; Jackson IPG PLLC

(57) ABSTRACT

A method is provided to optimize the surface of a carbon electrode for flow battery. A reaction solution is prepared as containing a requested ratio of functional group. After spraying the reaction solution on the carbon electrode, a number of related parameters of an atmospheric plasma are set for activation the carbon electrode. Thus, the functional group is covalently bonded on the surface of the carbon electrode according to requirement. Thereby, an accurate control of the type and number of the functional group bonded on the surface of the carbon electrode is achieved with the stability and performance of flow battery further enhanced.

4 Claims, 3 Drawing Sheets

METHOD OF OPTIMIZING SURFACE OF CARBON ELECTRODE FOR FLOW BATTERY

TECHNICAL FIELD OF THE INVENTION

The present invention relates to optimizing surface of a carbon electrode; more particularly, to provide energy and condition for covalent bonding between surface of a carbon electrode and a reaction solution containing a functional group ratio base on user's request, where the present invention configures the functional group with special structure (i.e. double-bond electrons or lone-pair electrons), which is a hydroxyl group, a carboxyl group, an amine group, an amide group, or a combination of at least two of the above; and a hydrophilic compound or derivative thereof is thus configured with the ratio controlled during preparation.

DESCRIPTION OF THE RELATED ARTS

Electrochemical flow battery, also known as redox flow battery, is an electrochemical energy storage device. They are divided into two categories: vanadium redox flow battery (VRFB) and zinc-bromine redox flow battery (ZBB). The VRFB has the characteristics of excellent charge/discharge performance, long cycle life, and low cost. Its manufacture, use, and disposal do not produce harmful substances, and make it an ideal green energy storage device.

Recently, flow battery technologies are vigorously developed. Carbon electrode is a key component for redox flow battery, and is greatly valued of no doubt. For the modification of carbon electrode, many improvement methods have been exposed. Several existing methods of modifying carbon electrode for flow battery are described in the following:

In a prior art, all materials including a modifier are mixed together to be sintered at a high temperature. Nitrogen contained in the modifier is used to form a nitrogen-containing functional group during the high-temperature sintering for obtaining a nitrogen-containing carbon electrode. However, this prior art has to process sintering at a high temperature (400° C. to 1200° C.), instead of covalently bonding with atmospheric-pressure plasma.

In another prior art, an oxidation process (e.g., wet chemical oxidation, electrolytic oxidation, dry oxidation, etc.) is applied on electrode surface with oxide in a form of functional group, such as hydroxyl group, carbonyl group, quinone group, lactone group, and free radical. However, this prior art introduces several functional groups in oxidation, instead of using oxygen radicals to provide a highly reactive environment for introducing the functional groups for chemical covalent bonding. Moreover, the overall process has to undergo various high temperature reactions under a temperature of thousands of degrees for more than 1 hour with lots of time and energy consumed, not to mention the difficulties in large-scale modification.

In another prior art, after activating carbon electrode surface with a low-temperature atmospheric-pressure plasma, reactions and modification are processed in the air at room temperature or by immersion in hydrophilic monomer. However, this prior art uses an unknown number of hydroxyl (OH) bondings, which does nothing but freely grows the functional group without controlling the ratio of the functional group obtained in the end.

As is known, there is still considerable room for the development of electrode, since the electrode plays a very important role in flow battery. If an easy way can be found for greatly improving the efficiency of the battery with the development, the ratio of efficiency to price can be considerably enhanced. Hence, the prior arts do not fulfill all users' requests on actual use.

SUMMARY OF THE INVENTION

The main purpose of the present invention is to configure a reaction solution containing a ratio of functional group based on user's request to spray the reaction solution on surface of a carbon electrode and process with an atmospheric plasma for covalently bonding the functional group, which is a hydroxyl group, a carboxyl group, an amine group, an amide group, etc., on the surface of the carbon electrode according to requirement with the stability and performance of flow battery further enhanced.

To achieve the above purposes, the present invention is a method of optimizing surface of a carbon electrode for flow battery, comprising steps of: (a) solution configuration: obtaining a hydrophilic compound or derivative thereof having functional group with double-bond electrons or lone-pair electrons, and controlling a ratio of at least one requested functional group during preparation to obtain a reaction solution; and (b) activation: spraying the reaction solution on a carbon electrode; and, after setting a plurality of related reaction parameters of an atmospheric plasma and processing activation with the atmospheric plasma, covalently bonding a requested ratio of the at least one functional group onto surface of the carbon electrode to accurately control the type and number of the at least one functional group bonded on the surface of the carbon electrode. Accordingly a novel method of optimizing surface of a carbon electrode for flow battery is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
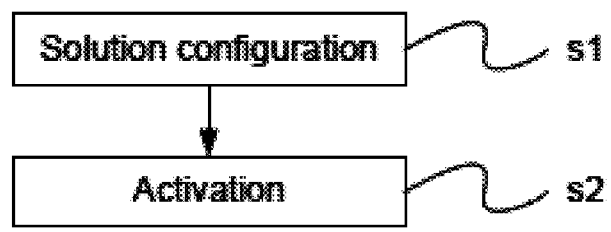
FIG. 1 is the flow view showing the preferred embodiment according to the present invention.
Figure 2:
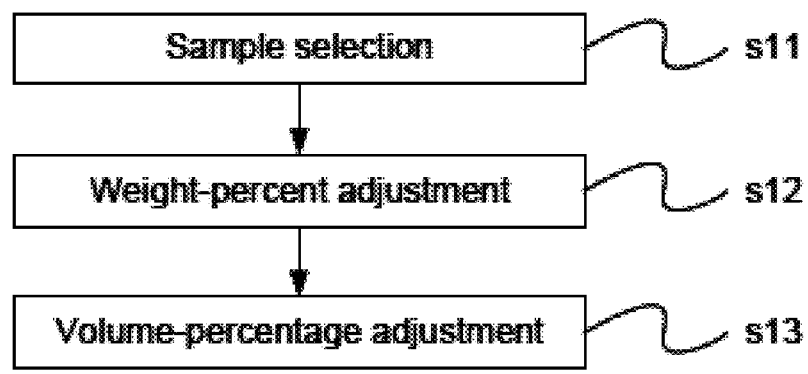
FIG. 2 is the flow view showing the solution configuration.
Figure 3:
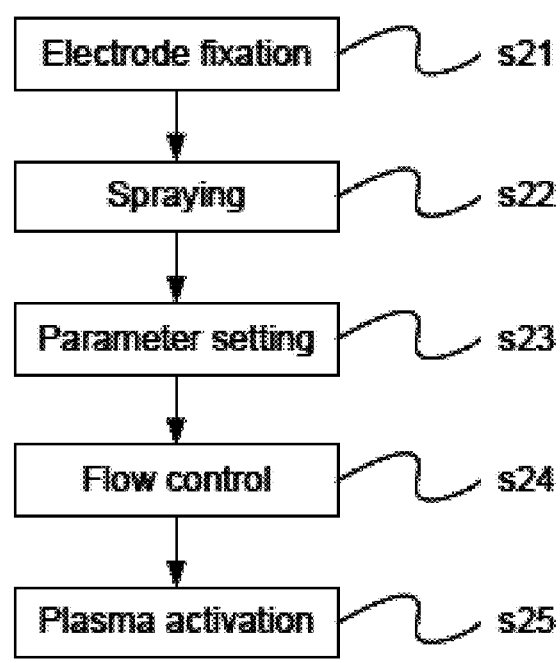
FIG. 3 is the flow view showing the activation.

Please refer to FIG. 1 to FIG. 3, which are a flow view showing a preferred embodiment according to the present invention; a flow view showing solution configuration; and a flow view showing activation. As shown in the figures, the present invention is a method of optimizing surface of a carbon electrode for flow battery, comprising the following steps:

(a) Solution configuration s1: A hydrophilic compound or derivative thereof is configured. The hydrophilic compound or derivative thereof has functional group with double-bond electrons or lone-pair electrons. A ratio of at least one requested functional group is controlled during preparation for obtaining a reaction solution.

(b) Activation s2: The reaction solution is sprayed on a carbon electrode. After setting a plurality of related reaction parameters of an atmospheric plasma and processing activation with the atmospheric plasma, a requested ratio of the at least one functional group is covalently bonded onto surface of the carbon electrode to accurately control the type and number of the at least one functional group bonded on the surface of the carbon electrode. Thus, a novel method of optimizing surface of a carbon electrode for flow battery is obtained.

In a state-of-use, the flow of the solution configuration shown in FIG. 2 comprises the following sub-steps:

(a1) Sample selection s11: The hydrophilic compound or derivative thereof is obtained. The hydrophilic compound or derivative thereof has the functional group with the double-bond electrons or lone-pair electrons, which is a hydroxyl group, a carboxyl group, an amine group, an amide group, or a combination of at least two of the above.

(a2) Weight-percent adjustment s12: A requested weight percentage (wt. %) of the hydrophilic compound or derivative thereof is configured to be fit in a range of 1~10 wt. %.

(a3) Volume-percentage adjustment s13: A requested volume percentage (vol. %) of the at least one functional group of the hydrophilic compound or derivative thereof is configured to obtain a reaction solution.

In a state-of-use, the flow of the activation shown in FIG. 3 comprises the following steps:

(b1) Electrode fixation s21: A carbon electrode is fixed on an atmospheric-plasma machine.

(b2) Spraying s22: A reaction solution is atomized to be sprayed on surface of the carbon electrode.

(b3) Parameter setting s23: A plurality of related response parameters of the atmospheric-plasma machine are set according to requirement. The related response parameters comprises an advancing speed and a plasma power.

(b4) Flow control s24: A plurality of atmospheric-plasma conditions of a gas passing into the atmospheric plasma machine are controlled, where a flow range of the gas is set.

(b5) Plasma activation s25: According to the related response parameters and the flow range of the gas, the atmospheric plasma is generated with a low temperature to activate the surface of the carbon electrode with the atmospheric plasma to covalently bond the at least one functional group in the reaction solution onto the surface of the carbon electrode. Therein, on the surface of the carbon electrode, a requested ratio of the at least one functional group, like a hydroxyl group, a carboxyl group, an amine group, an amide group, or a combination of at least two of the above, is obtained to accurately control the type and number of the at least one functional group bonded on the surface of the carbon electrode. Thus, the surface of the carbon electrode is optimized.

The present invention improves charge/discharge efficiency for flow battery. As compared to traditional methods, the present invention configures a reaction solution containing a ratio of functional group based on user's request. The reaction solution is sprayed on surface of a carbon electrode and processed with an atmospheric plasma. Then, the functional group, which can be a hydroxyl group, a carboxyl group, an amine group, an amide group, etc., is covalently bonded on the surface of the carbon electrode according to the user's request for further enhancing the stability and performance of flow battery. Thus, the present invention has the following features:

1. The present invention uses a low-temperature atmospheric-pressure plasma. The high cost of the conventional low-voltage plasma process is improved for mass production. As compared to conventional heat treatment, acid treatment, and other technical treatments, not only performance is outstanding, but also operation is fast, easy, safe, and environmentally protective with input cost reduced.

2. The present invention provides energy and condition for covalent bonding between surface of a carbon electrode and a reaction solution containing a functional group ratio base on user's request, which is not like the traditional technology of hydroxyl (OH) with an unknown number of bondings.

3. The present invention configures the functional group with special structure (i.e. double-bond electrons or lone-pair electrons), which is a hydroxyl compound or its derivative containing a hydroxyl group, a carboxyl group, an amine group, an amide group, or any combination thereof, with the ratio controlled during preparation.

To sum up, the present invention is a method of optimizing surface of a carbon electrode for flow battery, where a reaction solution containing a requested ratio of functional group is prepared; after spraying the reaction solution on a carbon electrode, a number of related parameters are set for an atmospheric plasma for activating the carbon electrode with the atmospheric plasma; the functional group is covalently bonded on the surface of the carbon electrode according to requirement; and an accurate control of the type and number of the functional groups bonded on the surface of the carbon electrode is achieved with the stability and performance of flow battery further enhanced.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of optimizing a surface of a carbon electrode for a flow battery, comprising the steps of:
   (a) solution configuration: obtaining a compound selected from a group consisting of a hydrophilic compound and a derivative thereof, said compound having at least one functional group with featured electrons selected from a group consisting of double-bond electrons and lone-pair electrons, and controlling a ratio of said at least one functional group during preparation to obtain a reaction solution; and
   (b) activation: spraying said reaction solution on a carbon electrode; and, after setting a plurality of related reaction parameters of an atmospheric plasma and processing activation with said atmospheric plasma, covalently bonding a requested ratio of said at least one functional group onto the surface of said carbon electrode to accurately control the type and number of said at least one functional group bonded on said surface of said carbon electrode.

2. The method according to claim 1,
   wherein step (b) comprises steps of:
   (b1) electrode fixation: fixing said carbon electrode on an atmospheric-plasma machine;
   (b2) spraying: atomizing said reaction solution to be sprayed on the surface of said carbon electrode;

(b3) parameter setting: setting said plurality of related reaction parameters of said atmospheric-plasma machine according to requirement;
(b4) flow control: controlling atmospheric-plasma conditions of a gas passing into said atmospheric plasma machine, wherein a flow range of said gas is set; and
(b5) plasma activation: according to said plurality of related response reaction parameters and said flow range of said gas, obtaining said atmospheric plasma with a low temperature to activate said surface of said carbon electrode with said atmospheric plasma to covalently bond said at least one functional group in said reaction solution onto said surface of said carbon electrode, wherein, on said surface of said carbon electrode, said requested ratio of said at least one functional group selected from a group consisting of a hydroxyl group, a carboxyl group, an amine group, an amide group, and a combination of at least two of the above is obtained to accurately control the type and number of said at least one functional group bonded on said surface of said carbon electrode.

3. The method according to claim 2,
wherein said gas is selected from a group consisting of a nitrogen gas and an inert gas.

4. The method according to claim 1,
wherein said plurality of related reaction parameters comprises an advancing speed and a plasma power.

* * * * *